United States Patent
Song et al.

(10) Patent No.: US 11,747,826 B2
(45) Date of Patent: Sep. 5, 2023

(54) METHOD FOR ROUTE OPTIMIZATION BASED ON DYNAMIC WINDOW AND REDUNDANT NODE FILTERING

(71) Applicants: Chongqing University, Chongqing (CN); Star Institute of Intelligent Systems, Chongqing (CN); Dibi (Chongqing) Intelligent Technology Research Institute Co., Ltd., Chongqing (CN)

(72) Inventors: Yongduan Song, Chongqing (CN); Congyi Zhang, Chongqing (CN); Lihui Tan, Chongqing (CN); Junfeng Lai, Chongqing (CN); Saiyu Wang, Chongqing (CN); Yankai Zhang, Chongqing (CN)

(73) Assignees: CHONGQING UNIVERSITY, Chongqing (CN); STAR INSTITUTE OF INTELLIGENT SYSTEMS, Chongqing (CN); DIBI (CHONGQING) INTELLIGENT TECHNOLOGY RESEARCH INSTITUTE CO., LTD., Chongqing (CN)

(*) Notice: Subject to any disclaimer, the term of this patent is extended or adjusted under 35 U.S.C. 154(b) by 106 days.

(21) Appl. No.: 17/403,243

(22) Filed: Aug. 16, 2021

(65) Prior Publication Data
US 2022/0404836 A1 Dec. 22, 2022

(30) Foreign Application Priority Data
Jun. 18, 2021 (CN) .......................... 202110678202.1

(51) Int. Cl.
G05D 1/02 (2020.01)

(52) U.S. Cl.
CPC ................................. *G05D 1/0274* (2013.01)

(58) Field of Classification Search
CPC ..... G05D 1/0221; G05D 1/0274; G01C 21/34
See application file for complete search history.

(56) References Cited

U.S. PATENT DOCUMENTS

| 2014/0324342 A1* | 10/2014 | Chen | .................... | G06Q 10/047 |
| | | | | 701/533 |
| 2021/0078174 A1* | 3/2021 | Qin | ...................... | G05D 1/0253 |

(Continued)

OTHER PUBLICATIONS

Dieter Fox, The Dynamic Window Approach, 1971, University of Bonn, Carnegie Mellon University (Year: 1997).*

*Primary Examiner* — Kenneth J Malkowski
*Assistant Examiner* — Carville Albert Hollingsworth, IV
(74) *Attorney, Agent, or Firm* — Tutunjian & Bitetto, P.C.

(57) ABSTRACT

The present disclosure discloses a method for route optimization based on dynamic window and redundant node filtering, comprising using an existing raster map data set to determine the coordinate information of a starting position and a destination position of movement, and to mark a destination node and an obstacle node in the raster map; using A* algorithm to plan a global route; globally optimizing the global route planned by A* algorithm, and filtering redundant nodes out; combining a dynamic window algorithm to perform the local optimization section by section on the optimized global route so as to obtain a final global route. According to the present disclosure, the combination of algorithms reduces a single movement duration of a mobile robot and improves the smoothness of the movement route curve. At the same time, the problems of the robot occurring on the route during the static driving are alleviated.

3 Claims, 3 Drawing Sheets

(56) References Cited

U.S. PATENT DOCUMENTS

2021/0397191 A1* 12/2021 Nakai .................. G05D 1/0088
2022/0362939 A1* 11/2022 Zhong ................... B25J 9/1697

* cited by examiner

METHOD FOR ROUTE OPTIMIZATION BASED ON DYNAMIC WINDOW AND REDUNDANT NODE FILTERING

CROSS REFERENCE TO RELATED APPLICATION(S)

This patent application claims the benefit and priority of Chinese Patent Application No. 202110678202.1, filed on Jun. 18, 2021, the disclosure of which is incorporated by reference herein in its entirety as part of the present application.

TECHNICAL FIELD

The present disclosure relates to the field of motion planning in the mobile robot technology, and in particular to a method for route optimization based on dynamic window and redundant node filtering.

BACKGROUND ART

Robot technology, as a technology integrating multiple disciplines, has been a hot research topic for many years. In this technology, route planning, as a key technology in the research and development of the mobile robot technology, aims at selecting an optimal or suboptimal obstacle avoidance route from the starting point to the end point in the task zone with reference to an index of a certain parameter (such as lowest cost, shortest route selection, shortest operation time). According to the level of robot's understanding of the working area information, route planning can be divided into global route planning based on the understanding of the entire area information and local route planning based on the understanding of the local area information, both of which have advantages and disadvantages. In most cases recently, it is necessary to combine global and local route planning in practical operations. The global route planning aims at producing a global optimal route, while the local route aims at avoiding obstacles in real time.

A* algorithm, one of the most popular global route search and selection methods, is highly flexible and can be widely applied to various environments. The secret of the success of A* algorithm is that it combines the information used by Dijkstra algorithm (which is beneficial to the position close to the starting point) and the information used by Greedy Best First Search (which is beneficial to the position close to the destination). By calculating the cost of routing nodes, the node at the lowest cost is selected, and nodes with the smallest heuristic function are expanded in sequence to find the optimal route. Although it can find a route relatively good in length by the traditional A* algorithm, the problems of this route are obvious: redundant nodes and a lot of turning points, which are unfavorable to the actual movement of a robot.

The dynamic window algorithm has become a major algorithm on local obstacle avoidance in a dynamic environment because it is applicable to the movement characteristics of the mobile robot, highly flexible, and advantageous in many other aspects. The basic concept of the dynamic window algorithm is to predict in real time the speed space $(v_t, w_t)$ and state space $(x_t, y_t, yaw_t, v_t, w_t)$ of the mobile robot in a time t during the route planning, simulate the movement trajectory of the mobile robot in the prediction time, and then determine the optimal movement trajectory according to the evaluation function, so as to reach the destination position and complete the route planning.

This method in the present disclosure pertains to a local route planning. If the robot only moves by this algorithm, it can guarantee a good movement posture, but needs to traverse too many nodes to reach the destination point, which is inefficient.

SUMMARY

For the problem described above for the prior art, a technical problem to be solved by the present disclosure is how the route can be optimized as much as possible to achieve the smoother and more reliable robot route.

To solve the first technical problem described above, the present disclosure adopts the following technical scheme: a method for route optimization based on dynamic window and redundant node filtering, including:

S100: By using an existing raster map data set, the coordinate information of a starting position and a destination position of movement is determined, and a destination node and an obstacle node are marked in the raster map;

S200: A* algorithm is used to plan a global route;

S300: The global route planned by A* algorithm is globally optimized, filtering redundant nodes out;

S400: By combining the dynamic window algorithm, the local optimization is performed section by section on the global route optimized in S300 so as to obtain a final global route.

For improvement, the A* algorithm is used to plan a global route in S200, including the following steps:

S210: Two empty tables OpenList and CloseList are built and initialized, and a starting position is set as a current node and stored into the OpenList list. If the current node is not a destination point, an extended node function is called to select all nodes adjacent to the current node and extensible, and information of all the extended nodes are stored into the OpenList list;

S220: An insert node function is called to traverse all extensible nodes and calculate a cost function F corresponding to these nodes, which is expressed as:

$$F(n) = G(n) + H(n)$$

In the formula, n represents the current node; F(n) is the cost function of the current node n; G(n) is the actual cost value of the mobile robot from an initial node to the node n; H(n) is the cost value of the mobile robot reaching the destination node from the current node n, which selects the Euclidean distance between these two nodes to represent H(n), and the function of H(n) is expressed as:

$$H(n) = \sqrt{(x_g - x_n)^2 + (y_g - y_n)^2}$$

Wherein $(x_g, y_g)$ represents the coordinates of the destination node in the raster map and $(x_n, y_n)$ represents the coordinates of the current node in the raster map;

S230: The node corresponding to the minimum value of the cost function F(n) is selected, which is then deleted from the OpenList and stored into the CloseList. At the same time, this node is set as the current node connected to the previous node. S220 is repeated until the current node turns to be the destination point, and the global route is exported.

As an improvement, the global route planned by A* algorithm in S300 is globally optimized, and redundant nodes are filtered out, including:

S310: The route node listed in the CloseList that is obtained in S200 is labeled as $P\{P_j, 1 \leq j \leq n\}$, wherein $P_1$ is the starting point of the route and $P_n$ is the end point of the route. A key point set U{$P_1, P_n$} with the only initial values, $P_1$ and $P_n$, is created for storing key nodes after route optimization;

S320: For the node set P{$P_i$, $1 \leq j \leq n$}, if m=2, 3, 4, . . . n, the connection starts in sequence from $P_1$ to $P_2, P_3, \ldots$, and $P_m$. It is determined whether any obstacle node exists between the straight line $P_1 P_m$, and, if so, the node $P_{m-1}$ must exist in the route. If the straight line $P_1 P_m$ does not pass through the obstacle node, it is determined that $P_{m-1}$ is a redundant node;

All nodes that must exist in the route are added to the set U. After the selection of key points is done, the set U{$P_1$, $P_{m-1}, \ldots, P_{m+k}, P_n$}($2 \leq m \leq n$, $1 \leq k \leq n-m$) contains all key nodes. It is assumed that the number of nodes in U is r, namely U{$P_1, P_2, \ldots, P_r$}, ($1 \leq r \leq n$).

S330: All nodes in the set U are connected in sequence to complete the global optimization of the route.

As an improvement, in S400, by combining the dynamic window algorithm, the local optimization is performed section by section on the global route optimized in S300 so as to obtain a final global route, which specifically includes:

S410: As for the set U, all nodes starting from the starting point $P_1$, except the end point $P_r$, are taken as the starting points of local route planning in turn, with the starting points being labeled as {$S_1, S_2, \ldots, S_{r-1}$}. At the same time, {$P_2, P_3, \ldots, P_r$} starting from the second node $P_2$ in the set U are labeled as the end points {$D_1, D_2, \ldots, D_{r-1}$} of local route planning in turn. As a result, the global route can be divided into a total of r−1 segments, $S_1 D_1, S_2 D_2, \ldots, S_{r-1} D_{r-1}$, and the coordinate value of $S_1$ in the raster map is ($x_{S_1}, y_{S_1}$) the coordinate value of $D_1$ is ($x_{D_1}, y_{D_1}$), and so on;

S420: A state parameter set L(l) of the mobile robot is initialized, wherein l(x, y, yaw, v, w) records state parameters of the robot movement in the planned route, including position, course angle, linear velocity and angular velocity. As for the robot, its initial linear velocity is set to v(m/s), its initial angular velocity is set to w(rad/s) and its initial navigation angle is set to yaw(rad);

S430: A slope angle of $S_i D_i$ is calculated with the following formula:

$$\alpha_i = \arctan\left(\frac{y_{D_i} - y_{S_i}}{x_{D_i} - x_{S_i}}\right)$$

In the formula, $x_{D_i}, y_{D_i}$ are the abscissa and ordinate of $D_i$ respectively, and $x_{S_i}, y_{S_i}$ are the abscissa and ordinate of $S_i$ respectively;

The slope angle of $S_i D_i$ section route is converted into a radian value as an initial course angle of the mobile robot, and the formula for converting the slope angle into the radian value is as follows:

yaw$_i$=α×180°÷π

All state parameters $l_i(x_i, y_i, yaw_i, v_i, w_i)$, $1 \leq i \leq r$ of the robot in the $S_i D_i$ section route are acquired, wherein $x_i, y_i$ are the abscissa and ordinate of node $S_i$ respectively, $v_i$ is the linear velocity at the end point of the previous section route read in the $S_i D_i$ section route, and $w_i$ is the angular velocity at the end point of the previous section route read in the $S_i D_i$ section route;

S440: The slope angle $\alpha_{i+1}$ of the $S_{i+1} D_{i+1}$ section route is calculated according to S430, and yaw$_i$ in the previous state parameter $l_i$ of the robot is converted into the angle value β, wherein the formula for converting the radian value into the angle value is as follows:

β=yaw$_i$×π÷180°

By comparing $\alpha_{i+1}$ and β, if $|\alpha_{i+1} - \beta| < 60°$, the robot keeps the latest state $l_{i+1}(x_{i+1}, y_{i+1}, yaw_{i+1}, v_{i+1}, w_{i+1})$; while if $|\alpha_{i+1} - \beta| \geq 60°$, in order to avoid redundant route sections and unnecessary movement time due to the robot detouring and turning, the robot navigation angle is set to $$yaw_{i+1} = \frac{yaw_i}{2};$$

S450: S440 is repeated until the mobile robot reaches the end point $D_{r-1}$ of the r−1$^{th}$ route section, and a set L($l_1, l_2, \ldots, l_i, l_{i+1}, \ldots, l_r$) recording all state parameters of the mobile robot is obtained, thus completing the optimization of the local routes.

In comparison to the prior art, the present disclosure has at least the following advantages:

1. The present disclosure discloses a method for route optimization based on dynamic window and redundant node filtering, which combines the A* algorithm and the dynamic window algorithm to optimize global planning and local planning. On the one hand, this method greatly alleviates limitations of each of the two algorithms. Traditional A* algorithm can produce a route relatively satisfactory in length, but the route has redundant nodes and many turning points. The dynamic window algorithm functions for local route planning. If the robot only moves by this algorithm, it can guarantee a good movement posture, but has to traverse too many nodes to reach the destination point, which is inefficient. In the present disclosure, redundant nodes are removed firstly based on a global route already planned in a map; then, on the basis of this optimized route, the dynamic window algorithm is used for targeted local optimization (aiming at turning points), so as to learn from strengths and make up for shortcomings; finally, a smoother route with satisfactory length and applicable to the actual movement of the robot can be obtained. On the other hand, the method allows a smoother and safer planned route, and enables higher efficiency of the mobile robot movement. First of all, a global route is planned by A* algorithm, and then an algorithm that filters redundant nodes out and retains key nodes is used to eliminate unnecessary nodes in the global route, so as to ensure the global optimization of the route. Then, according to the key nodes in combination with the concept of dynamic window algorithm, each segment of local route is locally optimized to improve the safety and smoothness of the route.

2. The method claimed in the present disclosure is higher in accuracy, safety and movement efficiency, has strong adaptability depending on route planning at different scenes, which may well support the patrol task of the mobile robot in a specific environment.

3. The method claimed in the present disclosure combines the A* algorithm for global route planning and the dynamic window algorithm for local route planning, and optimizes the two algorithms respectively, thereby planning a reliable route with the shortest length, high smoothness and high safety for the mobile robot.

DETAILED DESCRIPTION OF THE EMBODIMENTS

Embodiments in the present disclosure will be further described with reference to accompanying drawings below.

Figure 1:
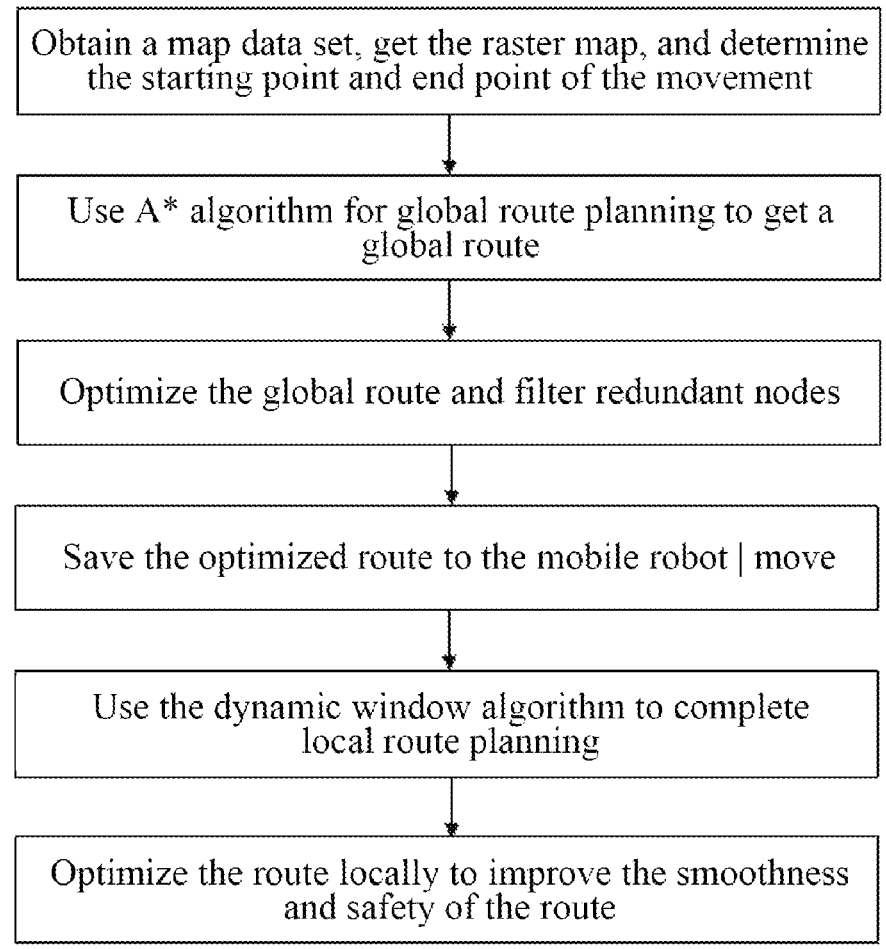
FIG. 1 is a process diagram of the method for route planning and optimization according to the present disclosure.
Figure 2:
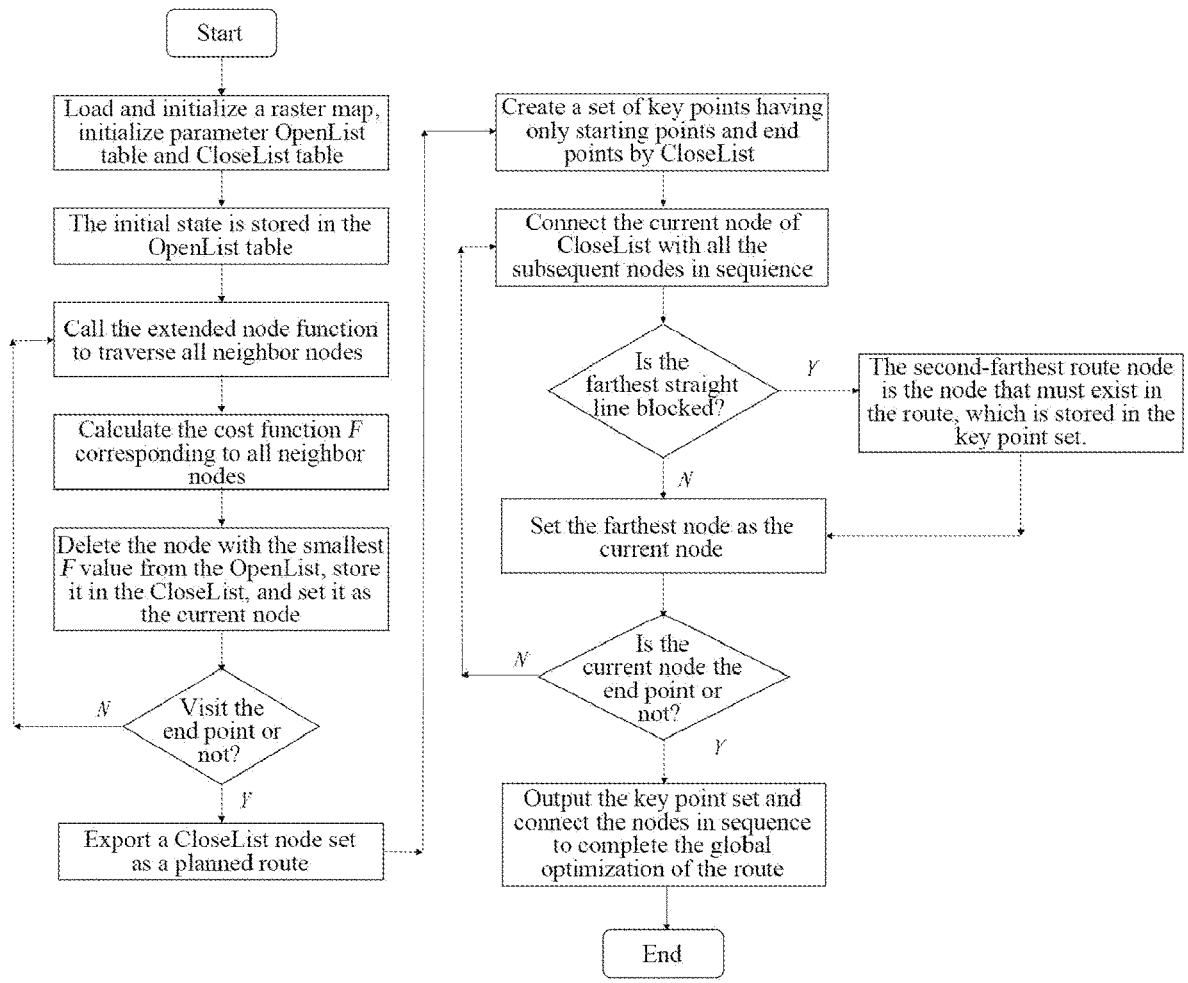
FIG. 2 is a procedure diagram of A* Algorithm and the global optimization.
Figure 3:
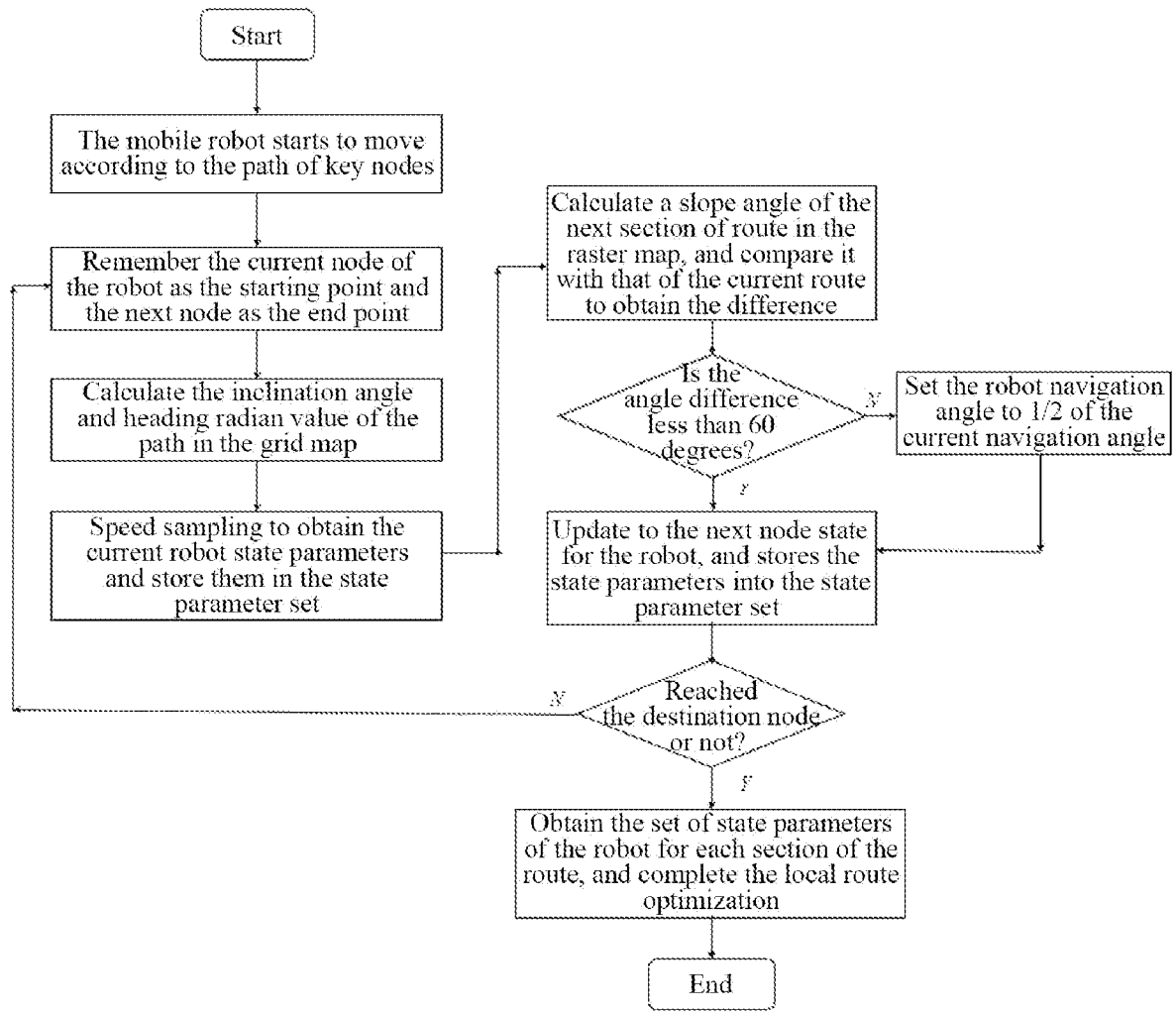
FIG. 3 is a process diagram of the local optimization based on the idea of the dynamic window algorithm.

By reference to FIGS. 1 to 3, a method for route optimization based on dynamic window and redundant node filtering is provided, including:

S100: By using an existing raster map data set, the coordinate information of a starting position and a destination position of movement is determined, and a destination node and an obstacle node are marked in the raster map. In this step, map data sets can be obtained by manual measurement, remote sensing measurement, photogrammetry, satellite data, and other manners, and can also be obtained by repeatedly collecting map information in an unknown environment by operating the mobile robot.

S200: A* algorithm is used to plan a global route, including:

S210: Two empty tables OpenList and CloseList are built and initialized, and a starting position is set as a current node and stored into the OpenList list. If the current node is not a destination point, an extended node function is called to select all nodes adjacent to the current node and extensible [all nodes excluding obstacle nodes], and information of all the extended nodes are stored into the OpenList list;

S220: An insert node function is called to traverse all extensible nodes and calculate a cost function F corresponding to these nodes, which is expressed as:

$$F(n)=G(n)+H(n)$$

In the formula, n represents the current node; F(n) is the cost function of the current node n; G(n) is the actual cost value of the mobile robot from an initial node to the node n; H(n) is the cost value of the mobile robot reaching the destination point from the current node n, which selects the Euclidean distance between these two nodes to represent H(n), and the function of H(n) is expressed as:

$$H(n)=\sqrt{(x_g-x_n)^2+(y_g-y_n)^2}$$

Wherein $(x_g, y_g)$ represents the coordinates of the destination node in the raster map and $(x_n, y_n)$ represents the coordinates of the current node in the raster map;

S230: The node corresponding to the minimum value of the cost function F(n) is selected, which is then deleted from the OpenList and stored into the CloseList. At the same time, this node is set as the current node connected to the previous node. S220 is repeated until the current node turns to be the destination point, and the global route is exported.

S300: The global route planned by A* algorithm is globally optimized, filtering redundant nodes out, including:

S310: The route node listed in the CloseList that is obtained in S200 is labeled as $P\{P_j, 1 \le j \le n\}$, wherein $P_1$ is the starting point of the route and $P_n$ is the end point of the route. A key point set $U\{P_1, P_n\}$ with the only initial values, $P_1$ and $P_n$, is created for storing key nodes after route optimization;

S320: For the node set $P\{P_j, 1 \le j \le n\}$, if m=2, 3, 4, ... n, the connection starts in sequence from $P_1$ to $P_2, P_3, \ldots,$ and $P_m$. It is determined whether any obstacle node exists between the straight line $P_1P_m$, and, if so, the node $P_{m-1}$ must exist in the route. If the straight line $P_1P_m$ does not pass through the obstacle node, it is determined that $P_{m-1}$ is a redundant node;

All nodes that must exist in the route are added to the set U. After the selection of key points is done, the set $U\{P_1, P_{m-1}, \ldots, P_{m+k}, P_n\}$ ($2 \le m \le n$, $1 \le k \le n-m$) contains all key nodes. It is assumed that the number of nodes in U is r, namely $U\{P_1, P_2, \ldots, P_r\}$, ($1 \le r \le n$).

S330: All nodes in the set U are connected in sequence to complete the global optimization of the route, which specifically includes:

S410: As for the set U, all nodes starting from the starting point $P_1$, except the end point $P_r$, are taken as the starting points of local route planning in turn, with the starting points being labeled as $\{S_1, S_2, \ldots, S_{r-1}\}$. At the same time, $\{P_2, P_3, \ldots, P_r\}$ starting from the second node $P_2$ in the set U are labeled as the end points $\{D_1, D_2, \ldots, D_{r-1}\}$ of local route planning in turn. As a result, the global route can be divided into a total of r−1 segments, $S_1D_1, S_2D_2, \ldots, S_{r-1}D_{r-1}$, and the coordinate value of $S_1$ in the raster map is $(x_{S_1}, y_{S_1})$ the coordinate value of $D_1$ is $(x_{D_1}, y_{D_1})$, and so on;

S420: A state parameter set L(l) of the mobile robot is initialized, wherein l(x, y, yaw, v, w) records state parameters of the robot movement in the planned route, including position, course angle, linear velocity and angular velocity. As for the robot, its initial linear velocity is set to v(m/s), its initial angular velocity is set to w(rad/s) and its initial navigation angle is set to yaw(rad);

S430: A slope angle of SiDi is calculated with the following formula:

$$\alpha_i = \arctan\left(\frac{y_{D_i}-y_{S_i}}{x_{D_i}-x_{S_i}}\right)$$

In the formula, $x_{D_i}, y_{D_i}$ are the abscissa and ordinate of $D_i$ respectively, and $x_{S_i}, y_{S_i}$ are the abscissa and ordinate of $S_i$ respectively;

The slope angle of $S_iD_i$ section route is converted into a radian value as an initial course angle of the mobile robot, and the formula for converting the slope angle into the radian value is as follows:

$$yaw_i = \alpha \times 180° \div \pi$$

All state parameters $l_i(x_i, y_i, yaw_i, v_i, w_i)$, $1 \le i \le r$ of the robot in the $S_iD_i$ section route are acquired, wherein $x_i, y_i$ are the abscissa and ordinate of node $S_i$ respectively, $v_i$ is the linear velocity at the end point of the previous section route read in the $S_iD_i$ section route, and $w_i$ is the angular velocity at the end point of the previous section route read in the $S_iD_i$ section route;

S440: The slope angle $\alpha_{i+1}$ of the $S_{i+1}D_{i+1}$ section route is calculated according to S430, and $yaw_i$ in the previous state parameter $l_i$ of the robot is converted into the angle value β, wherein the formula for converting the radian value into the angle value is as follows:

$$\beta = yaw_i \times \pi \div 180°$$

By comparing $\alpha_{i+1}$ and β, if $|\alpha_{i+1}-\beta|<60°$, the robot keeps the latest state $l_{i+1}(x_{i+1}, y_{i+1}, yaw_{i+1}, v_{i+1}, w_{i+1})$; while if $|\alpha_{i+1}-\beta| \ge 60°$, in order to avoid redundant route sections and unnecessary movement time due to the robot detouring and turning, the robot navigation angle is set to $$yaw_{i+1} = \frac{yaw_i}{2};$$

S450: S440 is repeated until the mobile robot reaches the end point $D_{r-1}$ of the r−1$^{th}$ route section, and a set $L(l_1, l_2, \ldots, l_i, l_{i+1}, \ldots, l_r)$ recording all state parameters of the mobile robot is obtained, thus completing the optimization of the local routes.

S400: By combining the dynamic window algorithm, the local optimization is performed section by section on the global route optimized in S300 so as to obtain a final global route.

The dynamic window algorithm is called DWA for short, and the core of DWA is to predict the future trajectory of the robot through different angular velocities and linear velocities. According to the present disclosure, the DWA method is used to optimize the real situation in the traveling process for optimization, which can be simply understood as: A* algorithm is used to plan a global route which becomes the movement route of the robot, and redundant nodes are filtered out, which is equivalent to preventing the robot from taking unnecessary paths. When the robot travels on the optimized global route, by DWA method, it avoids "pot holes" on the route, just like avoiding stone and pot holes on the road when driving. The route turn is wide enough that we turn from the inner track.

Experimental Comparison:

In view of the route planning and optimization methods applicable to the mobile robot mentioned in the present disclosure, in order to highlight the novelty thereof, this algorithm technology is put into a simulation experiment in comparison with traditional A* algorithm, Dijkstra algorithm and RRT algorithm as below, thus obtain the data listed in the following table. In the simulation experiment, three raster maps are constructed with the same size and randomly generated obstacles. They have 35 squares in the horizontal direction and 33 squares in the vertical direction, and a resolution of 10 cm*10 cm. The starting point coordinates are set to (0,0) and the end point coordinates are set as (31,28).

Comparison of length, calculation time and number of turning points produced by different algorithms are as shown in the following table.

| Map | Algorithm | Route length | Calculation time | Number of turning points |
|---|---|---|---|---|
| Map I | Dijkstra Algorithm | 466 | 0.0536 | 8 |
| | A* Algorithm | 466 | 0.0503 | 5 |
| | RRT Algorithm | 579 | 0.0056 | 15 |
| | This Algorithm | 440 | 0.0459 | 4 |
| Map II | Dijkstra Algorithm | 560 | 0.0612 | 16 |
| | A* Algorithm | 516 | 0.0596 | 14 |
| | RRT Algorithm | 521 | 0.0049 | 16 |
| | This Algorithm | 506 | 0.0512 | 4 |
| Map III | Dijkstra Algorithm | 482 | 0.0353 | 12 |
| | A* Algorithm | 480 | 0.0344 | 11 |
| | RRT Algorithm | 504 | 0.0081 | 30 |
| | This Algorithm | 450 | 0.0251 | 8 |

It can be seen from the above table that in the three simulation experiments, all the 4 route planning algorithms can be used to plan the route, but they may result in some differences in aspects such as route length, calculation time, and number of turning points.

It can be seen from the table content that RRT algorithm provides the shortest computation time, but it produces too many turning points. This is because the route produced by this algorithm is composed of random tree nodes one after another, which may be containing edges and corners, not smooth enough, not an ideal smooth curve, and not conducive to the actual motion of the robot. Dijkstra algorithm, A* algorithm and this algorithm in the present disclosure all produce better global routes than RRT algorithm. However, compared with Dijkstra algorithm and A* algorithm, this algorithm is advantageous because of short route length, fewer turning points and better smoothness of route, which is suitable for the actual movement of the mobile robot and facilitates the robot to follow the route trajectory to reach the destination point.

Finally, it is noted that the above embodiments are only for the purpose of illustrating the technical scheme of the present disclosure without limiting it. Although a detailed specification is given for the present disclosure by reference to preferred embodiments, those of ordinary skills in the art should understand that the technical schemes of the present disclosure can be modified or equivalently replaced without departing from the purpose and scope of the technical schemes thereof, which should be included in the scope of claims of the present disclosure.

What is claimed is:

1. A method for route optimization based on dynamic window and redundant node filtering, performed by a processor, comprising:
   S100: by using an existing raster map data set, determining coordinate information of a starting position and a destination position of movement, and marking a destination node and an obstacle node in the existing raster map;
   S200: using A* algorithm to plan a global route, to obtain a route node set;
   S300: performing a global optimization to the global route planned by the A* algorithm, to filter redundant nodes;
   S400: by combining the dynamic window algorithm, performing a local optimization section by section on the global route optimized in S300 so as to obtain a final global rout; and
   S500: controlling a mobile robot to move from the starting position to the destination position based on the final global route; wherein
   performing the global optimization to the global route planned by the A* algorithm to filter the redundant nodes in S300 comprises:
   S310: labeling the route node set that is obtained in S200 as $P\{P_j, 1 \leq j \leq n\}$, wherein $P_1$ is the starting point of the route and $P_n$ is the end point of the route; creating a key point set $U\{P_1, P_n\}$ for storing key nodes after route optimization;
   S320: for the node set $P\{P_j, 1 \leq j \leq n\}$, setting m=2, 3, 4, ... n, connecting in sequence from $P_1$ to $P_2, P_3, \ldots,$ and $P_m$, when any obstacle node exists between a straight line $P_1P_m$, taking the node $P_m-1$ as a required node of the route; when the straight line $P_1P_m$ does not pass through the obstacle node, determining that the node $P_{m-1}$ is a redundant node;
   adding all of the required nodes to the set U; wherein after the selection of key points is done, $U\{P_1, P_{m-1}, \ldots, P_{m+k}, P_n\}(2 \leq m \leq n, 1 \leq k \leq n-m)$ contains all key nodes; when a number of nodes in U is r, the set U is represented as $U\{P_1, P_2, \ldots, P_r\}$, $(1 \leq r \leq n)$;
   S330: connecting all nodes in the set U in sequence to complete the global optimization of the route.

2. The method for route optimization based on the dynamic window and the redundant node filtering according to claim 1, wherein the A* algorithm is used to plan a global route in S200, comprising the following steps:
   S210: building and initializing two empty tables OpenList and CloseList, setting the starting position as a current node, and storing the current node into the OpenList list; when the current node is not a destination point, calling an extended node function to select all extended nodes adjacent to the current node and storing information of all the extended nodes into the OpenList list;

S220: calling an insert node function to traverse all the extended nodes, and calculating a cost function F corresponding to these nodes, wherein the cost function F is expressed as:

$$F(n)=G(n)+H(n)$$

wherein, n represents the current node; F(n) is the cost function of the current node n; G(n) is an actual cost value of the mobile robot from an initial node to the current node n; H(n) is a cost value of the mobile robot reaching the destination point from the current node n, which selects the Euclidean distance between these two nodes to represent H(n), and the function of H(n) is expressed as:

$$H(n)=\sqrt{(x_g-x_n)^2+(y_g-y_n)^2}$$

wherein $(x_g, y_g)$ represents the coordinates of the destination node in the existing raster map and $(x_n, y_n)$ represents the coordinates of the current node in the existing raster map;

S230: selecting and deleting a node corresponding to a minimum value of the cost function F(n) from the OpenList and storing the node corresponding to the minimum value of the cost function F(n) into the CloseList; at the same time, setting the node corresponding to the minimum value of the cost function F(n) as the current node connected to the previous node; repeating S220 when the current node does not turn to be the destination point, and exporting the global route when the current node turns to be the destination point.

3. The method for route optimization based on the dynamic window and the redundant node filtering according to claim 1, wherein in S400, by combining the dynamic window algorithm, the local optimization is performed section by section on the global route optimized in S300 so as to obtain a final global route, which specifically comprises:

S410: as for the set U, taking all nodes starting from the starting point $P_1$, excepting the end point $P_r$, as the starting points of local route planning in turn, wherein the starting points are labeled as $\{S_1, S_2, \ldots, S_{r-1}\}$; taking $\{P_2, P_3, \ldots, P_r\}$ starting from the second node $P_2$ in the set U as the end points $\{D_1, D_2, \ldots, D_{r-1}\}$ of local route planning in turn; and dividing the global route into a total of r−1 segments, $S_1D_1, S_2D_2, \ldots, S_{r-1}D_{r-1}$, wherein a coordinate value of $S_i$ in the existing raster map is $(x_{S_i}, y_{S_i})$, and a coordinate value of $D_i$ is $(x_{D_i}, y_{D_i})$;

S420: initializing a state parameter set L(l) of the mobile robot, wherein l(x, y, yaw, v, w) records state parameters of the robot movement in the planned route, including position, course angle, linear velocity and angular velocity; as for the robot, its initial linear velocity is set to v(m/s), its initial angular velocity is set to w(rad/s) and its initial navigation angle is set to yaw(rad);

S430: calculating a slope angle of $S_iD_i$ with the following formula:

$$\alpha_i = \arctan\left(\frac{y_{D_i} - y_{S_i}}{x_{D_i} - x_{S_i}}\right)$$

wherein $x_{D_i}, y_{D_i}$ are an abscissa and an ordinate of $D_i$ respectively, and $x_{S_i}, y_{S_i}$ are an abscissa and an ordinate of $S_i$ respectively;

converting the slope angle of $S_iD_i$ section route into a radian value as an initial course angle of the mobile robot, wherein a formula for converting the slope angle into the radian value is as follows:

$$yaw_i = \alpha \times 180° \div \pi$$

acquiring all state parameters $l_i(x_{S_i}, y_{S_i}, yaw_i, v_i, w_i)$, $1 \leq i \leq r$ of the robot in the $S_iD_i$ section route, wherein $x_{S_i}, y_{S_i}$ are the abscissa and the ordinate of the node $S_i$ respectively, $v_i$ is the linear velocity at the end point of the previous route in the $DS_iD_i$ section route, and $w_i$ is the angular velocity at the end point of the previous section route read in the $S_iD_i$ section route;

S440: calculating the slope angle $\alpha_{i+1}$ of the $S_{i+1}D_{i+1}$ section route according to S430, and converting $yaw_i$ in the previous state parameter $l_i$ of the robot into the angle value β, wherein a formula for converting the radian value into the angle value is as follows:

$$\beta = yaw_i \times \pi \div 180°$$

when $|\alpha_{i+1} - \beta| < 60°$, keeping the robot in the latest state $l_{i+1}(x_{i+1}, y_{i+1}, yaw_{i+1}, v_{i+1}, w_{i+1})$; when $|\alpha_{i+1} - \beta| \geq 60°$, in order to avoid redundant route sections and unnecessary movement time due to the robot detouring and turning, setting the robot navigation angle to $$yaw_{i+1} = \frac{yaw_i}{2};$$

S450: repeating S440 when the mobile robot does not reach the end point $D_{r-1}$ of the r−1$^{th}$ route section, and obtaining a set $L(l_1, l_2, \ldots, l_i, l_{i+1}, \ldots, l_r)$ recording all state parameters of the mobile robot when the mobile robot reaches the end point $D_{r-1}$ of the r−1$^{th}$ route section, to complete the optimization of the local routes.

\* \* \* \* \*

UNITED STATES PATENT AND TRADEMARK OFFICE
CERTIFICATE OF CORRECTION

PATENT NO. : 11,747,826 B2
APPLICATION NO. : 17/403243
DATED : September 5, 2023
INVENTOR(S) : Yongduan Song et al.

Page 1 of 1

It is certified that error appears in the above-identified patent and that said Letters Patent is hereby corrected as shown below:

In the Claims

Column 8, Line 54, in Claim 1 should be:
- the selection of key points is done, the set U -

Column 10, Lines 26 and 27, in Claim 3 should be:
- end point of the previous section route read in the $S_iD_i$ section route, and $w_i$ -

Signed and Sealed this
Twelfth Day of December, 2023

*Katherine Kelly Vidal*

Katherine Kelly Vidal
*Director of the United States Patent and Trademark Office*